Aug. 25, 1953 A. KINKEAD 2,650,112
DOUBLE WALLED PIPE AND COUPLING THEREFOR
Filed Feb. 2, 1949 2 Sheets-Sheet 1
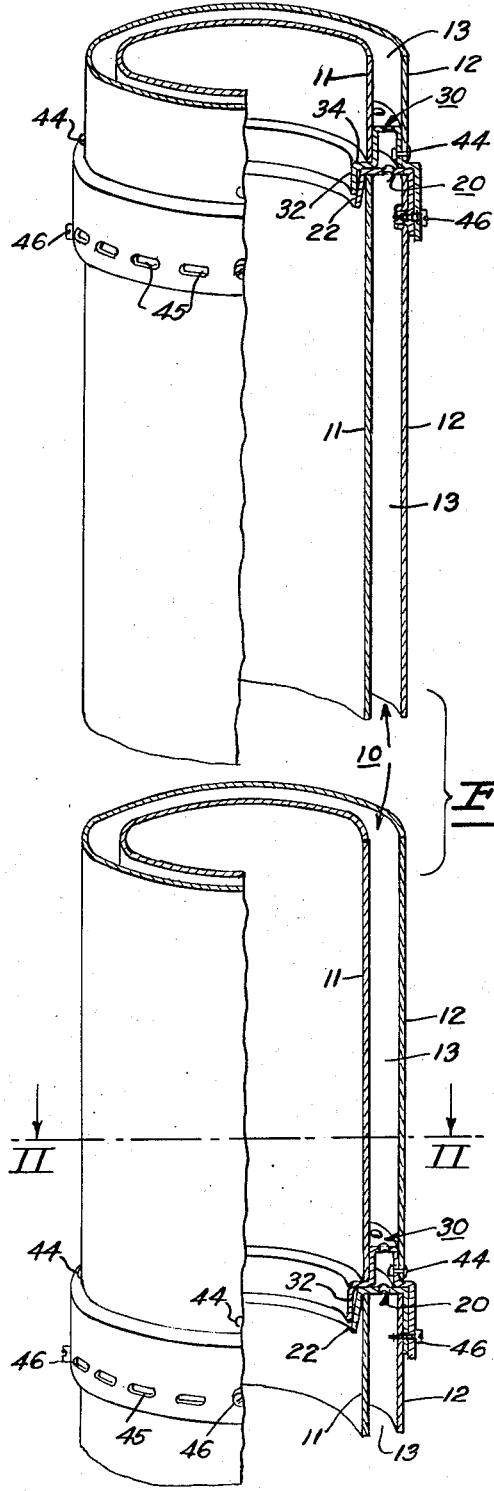
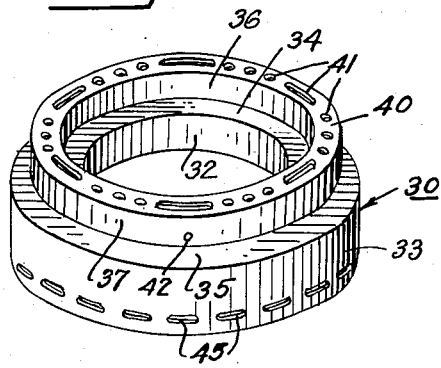
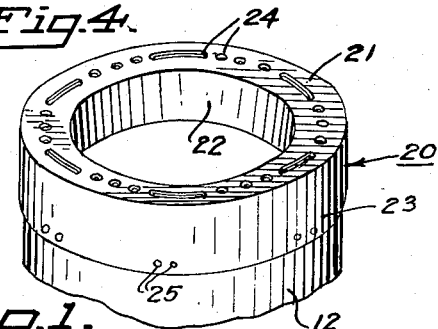
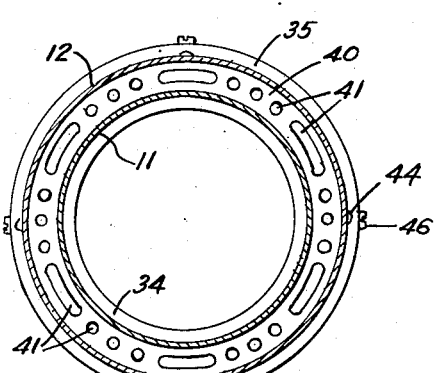
INVENTOR.
ALAN KINKEAD
BY
ATTORNEY

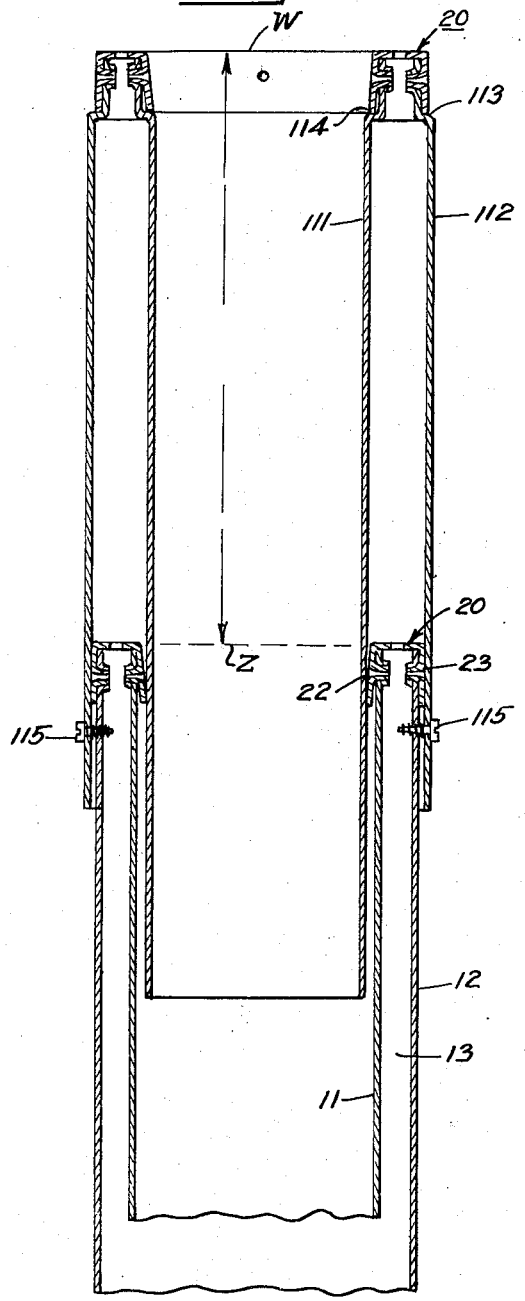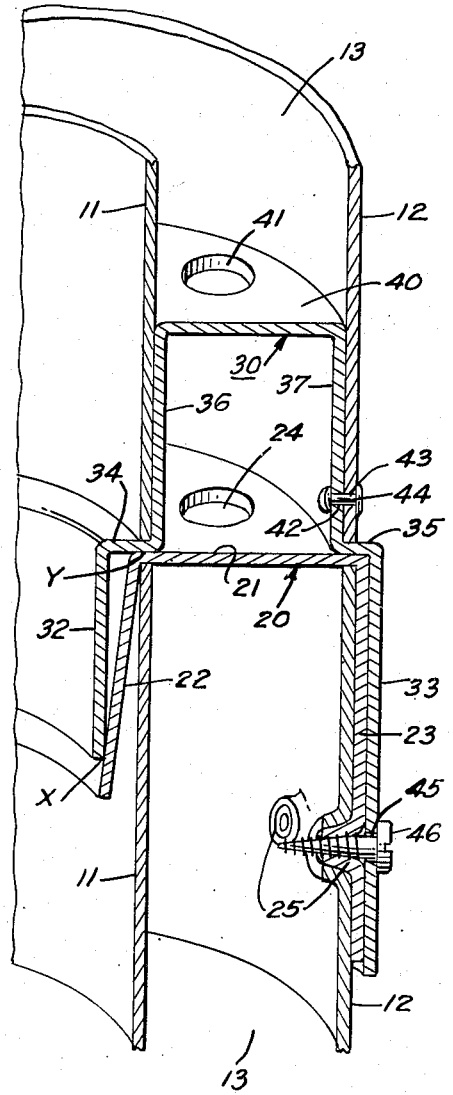

Patented Aug. 25, 1953

2,650,112

UNITED STATES PATENT OFFICE 2,650,112

DOUBLE WALLED PIPE AND COUPLING THEREFOR

Alan Kinkead, Los Altos, Calif., assignor to Williams-Wallace Company, San Francisco, Calif., a corporation of California Application February 2, 1949, Serial No. 74,118

4 Claims. (Cl. 285—22)

This invention relates to prefabricated double-walled metal flue or vent pipe. It is an improvement on the pipe shown in United States Patent No. 2,013,193, which up to the present has been the metal pipe most widely used in this field. This pipe is made up in the factory in short sections and is shipped out to furnace supply houses and sold by them to furnace men who erect the vent when installing a furnace or other gas burning appliance required by law to have a vent.

Composite pipes, such as double-walled pipes, are widely used for flues, among other things, because they eliminate the fire hazard of hot flue pipes. Such flue pipes are preferred by the National Board of Fire Underwriters and by the Underwriters Laboratories, Inc. The inner pipe, usually of aluminum, conducts the hot exhaust gases while the outer pipe, usually of galvanized iron, is spaced apart from the inner pipe and remains relatively cool at all times because of the air space between them. They are held apart slidably by annular spacing rings. Preferably, this cooling effect is enhanced by ventilating a current of cool air through this insulating space.

Certain problems have arisen over the years in the use of the prior art metal vent pipe, such as (a) the time consumed by the installer in making the very difficult joint between sections which requires punching on the job and inserting metal screws; this is impossible on the inner pipe (the one carrying the hot gases) so it is left with an insecure slip joint; (b) the susceptibility of the ends of the pipe to injury in handling from the factory to installation time; (c) the risk that some will install the flue with the inner of the two pipes omitted; (d) the necessity for cutting at least one section of pipe for length when making the installation; and (e) the lack of finished appearance of the pipe.

Prior art pipes have required a sheet metal man equipped with special airplane type sheet metal snips, punches, crimpers, drills, hammer and screw driver to assemble a string of sections of pipe. Contrasted with this, the pipe of the present invention requires no cutting on the job, no punching of holes, no crimping, and can be completely installed by an inexperienced workman using only a screw driver.

The present invention has achieved many desirable objectives and has overcome many of the problems perplexing the industry. For the first time it is now possible to put out complete, assembled plural-walled metal vent pipe sections which are tamper-proof and can be assembled quickly without any cutting on the job and with each section securely locked to its succeeding section; which have coupling members combined with the pipe walls so the condensate and outside moisture cannot penetrate between the walls; which have the couplings arranged to serve as spacing members, and as protection to the pipe ends; which can be made in oval or other non-circular shapes and can be assembled without difficulty; which when the sections are assembled make a double-seal fluid-tight joint into which no fluid can gain access; and which makes possible the use of a sliding section, adjustable in length, to fill the final gap in the assembled string of pipe sections so the installer has no cutting to do.

Other objects and advantages of the invention will appear from the following description of a detailed embodiment. This embodiment is presented in order to comply with United States Revised Statutes, section 4888, and is not intended to limit the claims beyond the fair import of their wording.

In the drawings:

Fig. 1 is a cutaway view in perspective of a double-walled pipe embodying the principles of this invention, the pipe being broken in the middle to conserve space on the drawings;

Fig. 2 is a view taken along the line II—II of Fig. 1;

Fig. 3 is a view in perspective of the female coupling member like the ones installed on the lower end of the pipe sections, as shown to its left in Fig. 1;

Fig. 4 is a view in perspective of the male coupling member like the one installed on the upper end of the pipe sections as shown in Fig. 1;

Fig. 5 is a fragmentary view in perspective of the coupling construction; and

Fig. 6 is a view in cross-section showing the means for fitting special length spaces without cutting the pipe sections.

In this invention, the successive sections of composite pipe are joined by a novel coupling member which is made up of two mating parts. The novel coupling members not only join the composite pipe sections together, but they are so arranged as to hold the plurality of pipes in spaced radial and axial alignment. The double-seal juncture provided by this coupler-spacer is gas-tight; the condensate is kept inside the inner pipe, and the rain water is kept out of the outer pipe so that in neither case will moisture collect in or run into the joints and rust them.

Fig. 1 shows, by way of example, a double-walled pipe 10, comprising an inner pipe 11 and an outer pipe 12. The pipes 11 and 12 may be circular as shown, or they may be oval, square, or any other shape. This invention at last makes practical from the standpoint of the manufacturer, the contractor and the building inspector, the use of non-circular shapes. Heretofore, these have been so difficult to fit together that few were used. The insulating space 13 between the two pipes 11 and 12, also provides a passage for a ventilating current of air, so that the outer pipe 12 is kept cool even when the inner pipe 11 is very hot.

At each end of each composite pipe section 10 is a special coupling member. On the top end is the male coupling member 20 and the female coupling member 30 is on the bottom end.

The male coupling member 20 comprises an annular ring 21 having a flared inner flange 22 and an outer flange 23. The radial web portion is shown perforated by a number of holes 24 so that the vertical passageway 13 of each pipe section is vented into the next adjacent section. Some manufacturers may prefer to omit the perforations 24 so that each passageway 13 becomes a sealed dead air space.

After the inner pipe 11 and the outer pipe 12 are assembled inside the male coupling member 20, the flange 23 and the outer pipe 12 are secured together by lancing as at 25. At intervals of approximately sixty degrees around the circumference of the outer flange 23, the lancings are arranged in pairs to simplify alignment with holes in the flange of the female coupling member. The torn metal interlocks the lanced parts and holds the coupler and the pipe walls together. While I have shown the outer pipe secured to the coupling, the inner pipe or both pipes could be secured to the coupling.

A female coupling member 30 is secured to the lower end of each composite pipe section 10 and includes an inner down-turned generally cylindrical flange 32 and similar outer down-turned flange 33. The width of the annular female slot in the coupler 30 is preferably wider than the width of the male member on the coupler 20 so that when assembled as shown in Fig. 5, the rim of the flange 32 will make a line sealing contact at X with the flared flange 22 and there will be a second seal where the radial surfaces meet at Y. This, I call a double-seal.

The female coupler 30 has offset radial shoulders 34 and 35 where the upper end of the flanges 32 and 33 join. Then these radial shoulders have axially extending flanges 36 and 37 at the inner periphery of the shoulders. The two flanges 36 and 37 are united by a web 40 which may or may not be perforated as at 41 in order to aid or hinder passage of air between each composite pipe's passageway 13.

The upturned flange 37 is perforated at spaced intervals by holes 42 which align with corresponding holes 43 in the outer pipe 12. Each female coupling member 30 is joined to its outer pipe (or inner pipe or both) by rivets 44 or equivalent fastening means through these holes. The flanges 36 and 37 and the shoulders 34 and 35 support and space the lower end of the inner and outer pipes 11 and 12 and make a compact unitary lower end for each pipe section. The outer down-turned flange 33 is perforated by a number of preferably horizontal slots 45.

When a male and a female coupling are secured to the outer pipe 12, the inner pipe 11 is held rigidly in place between the shoulder 34 and the radial web 21.

When two composite pipe sections are to be joined together, the male coupler 20 is nested in the female coupler 30 so the slots 45 overlie the lanced holes 25 in the outer rim 23 of the male coupler. Since the holes 25 are arranged in pairs, one of them will be exposed even if the other one is covered up by the web in between the slots 45. The joint between each composite section may then be made secure by using three metal screws 46, shown in the drawings, put in holes 25 spaced about 120° apart.

The outside diameter of the flange 37 should fit snugly the inside diameter of the pipe 12. The inside diameter of the flange 36 should fit snugly the outside diameter of the pipe 11. The outside diameter of the flange 22 should fit snugly the inside diameter of the pipe 11. The inside diameter of the flange 23 should fit snugly the outside diameter of the pipe 12. The above fits will assure that the ends of the pipes 11 and 12 will nest on the lower end against the shoulders 34 and 35 and on the upper end against the shoulder or web 21. Also these fits will assure a substantially continuous metal to metal butting of each string of pipe sections 11 and 12 at the joints. For example, in Figs. 1 and 5, working from the top down, the lower end of the pipe 11 bears on the shoulder 34 which in turn bears on the web 21 which in turn bears on the upper end of the next lower inner pipe section 11. The same is the condition with the pipe 12.

It will be noted that this coupling keeps the inner and outer pipes evenly spaced apart, that the coupling members 20 and 30 protect their respective pipe ends against damage by denting or crushing, and that in a few moments section on section can be joined together by an unskilled workman with no other tool than a screw driver.

The flared inner flange 22 of the male coupling member 20 assures tight fits with the female coupling member flange 32 at X and radial portion 34 at Y. It forms thereby a generally leak-tight fit so any condensate or gas fumes will find it practically impossible to penetrate the joint.

It rarely happens that the distance from the base of the flue pipe to the outlet in the roof, or to an elbow in a wall fitting, will be the exact sum of the lengths of a plurality of composite sections. In other words, if the distance to be spanned is 14 feet 6 inches and each composite section is 3 feet, it will take 4 such sections and one section cut down to 2 feet 6 inches. One of the advantages of this invention is the ease with which the installer can adjust for such a 2-foot 6-inch section.

As shown in Fig. 6, I provide a female pipe section which preferably would be the last piece to be added on the top of the flue, although if this would involve working up under a low roof, this female pipe section can be put lower down in the string of pipe.

This female slip pipe section is made up with a standard male coupling unit 20 at its top. The inner pipe 111 and outer pipe 112 are securely fastened to it and may be made about the length of one composite pipe section, although I prefer to have the inner pipe 111 enough longer than the outer pipe so that the inner pipe can be started inside the next lower coupling before the outer pipe engages it. The inside diameter of the outer pipe 112 is substantially equal to the outside diameter of the male coupling flange 23.

The outside diameter of the inner pipe 111 is substantially equal to the inside diameter of the flared coupling flange 22. This entails a slight offset at 113 and 114 and means that the male end of the composite unit below the female pipe section will slide in between the pipes 111 and 112. It is inserted six inches in the example given above, or so that the dimension from the dotted lines W to Z equals 2 feet 6 inches. It is thus an easy task for the installer to punch a few holes between the walls 112 and 12 and insert a metal screw 115 in each hole. The installer does not have to make any cuts on the job, or in the shop before going to the job. The building inspector knows that the inner pipe has not been omitted so no fire hazard is created. The building owner is assured that the flue will never set fire to his house and that the gas burning appliances connected to it will operate on a highly efficient basis.

While the pipes 11 and 12 have been referred to as metal, it is not my intention to limit this patent thereto, because other materials may be used and still obtain the benefits of the invention.

I claim:

1. Connecting means for adjacent ends of a pair of flue pipe sections, each including inner and outer tubes in radial spaced relations; comprising a male coupling on the end of one section and a female coupling on the adjacent end of the other section, the male coupling being of channel form in cross section and including a base portion spanning the space between the respective tubes and resting on the ends thereof, and side flanges projecting from the base portion and extending along the inner wall of the inner tube and the outer wall of the outer tube, the female coupling being of generally channel form in cross section and including a base portion extending radially of the respective tubes and disposed between same in substantial spaced relation to the ends thereof, side flanges projecting from the base portion and extending along the outer wall of the inner tube and the inner wall of the outer tube to the ends thereof, flanges projecting radially inward and radially outward from said side flanges providing shoulders supported on the base portion of said male coupling and supporting the ends of the tubes of the respective section, and other flanges projecting from said shoulder flanges in parallel relation to said side flanges and extending along the outer walls of the side flanges of the male coupling.

2. The structure according to claim 1, wherein the inner side flange of the male coupling diverges radially inward from its juncture with the base portion and wherein one of said other flanges is substantially spaced from the adjacent inner tube and has its free edge only in bearing engagement with said inner side flange.

3. A composite sectional pipe construction adapted for connection with other like sectional pipe constructions to form a flue pipe, comprising an inner pipe section and an outer concentric pipe section in spaced relation to the inner section providing a double-walled pipe; a coupling member at each end of said double-walled pipe, the coupling member at one end of said double-walled pipe comprising a collar of channel form and including a base in the form of a ring and flanges projecting from opposite edges of the ring, the said ring extending across the gap between said inner and outer pipe sections and resting upon the adjacent ends of said pipe sections, said flanges projecting toward the opposite end of said double-walled pipe and one thereof extending along the outer wall of said outer pipe section and the other thereof extending along the inner wall of the inner pipe section, the coupling member on the other end of said double-walled pipe comprising a collar including a channel portion disposed within the gap between said inner and outer pipe sections with its base portion spanning said gap in spaced relation to the corresponding ends of said pipe sections and with its side walls engaged with the inner wall of the outer pipe section and the outer wall of the inner pipe section, the said last collar further including radial shoulder portions projecting outwardly from said side walls and engaged with the adjacent ends of said inner and outer pipe sections, and said last collar further including a flange extending axially from the outer edge of each shoulder portion and extending away from the adjacent end of the double-walled pipe section.

4. The structure according to claim 3 wherein said first flange of said first collar engages the outer face of the outer pipe section and the said second flange of said first collar flares radially inwardly in spaced relation to the inner wall of said inner pipe section and the flanges of said second collar being parallel and in radial spaced relation to the outer and inner walls of the outer and inner pipe sections respectively.

ALAN KINKEAD.

References Cited in the file of this patent

UNITED STATES PATENTS

| Number | Name | Date |
|---|---|---|
| 1,085,303 | Scherer | Jan. 27, 1914 |
| 1,122,392 | Holub | Dec. 29, 1914 |
| 1,141,492 | Scherer | June 1, 1915 |
| 1,451,043 | Le Compte | Apr. 10, 1923 |
| 2,013,193 | Stadtfeld | Sept. 3, 1935 |
| 2,048,457 | Mauser | July 21, 1936 |

FOREIGN PATENTS

| Number | Country | Date |
|---|---|---|
| 840,472 | France | Jan. 16, 1939 |